United States Patent
Chang et al.

(10) Patent No.: US 11,262,263 B2
(45) Date of Patent: Mar. 1, 2022

(54) SENSING DEVICE, ELECTRONIC SYSTEM AND SENSING METHOD

(71) Applicant: ABILITY ENTERPRISE CO., LTD., New Taipei (TW)

(72) Inventors: Yen-Min Chang, New Taipei (TW); Cheng-En Lu, New Taipei (TW); Yen-Chen Lin, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 304 days.

(21) Appl. No.: 15/701,493

(22) Filed: Sep. 12, 2017

(65) Prior Publication Data

US 2018/0087985 A1   Mar. 29, 2018

(30) Foreign Application Priority Data

Sep. 23, 2016   (TW) .................................. 105130828

(51) Int. Cl.
| | | |
|---|---|---|
| *G06F 9/02* | (2006.01) | |
| *G01L 9/02* | (2006.01) | |
| *G06F 1/26* | (2006.01) | |
| *H04Q 9/00* | (2006.01) | |

(52) U.S. Cl.
CPC ................ *G01L 9/025* (2013.01); *G06F 1/26* (2013.01); *H04Q 9/00* (2013.01); *H04Q 2209/823* (2013.01)

(58) Field of Classification Search
CPC .... G01L 9/025; H04Q 9/00; H04Q 2209/823; G06F 1/26; G01N 17/04
USPC ......................................................... 324/701
See application file for complete search history.

(56) References Cited

U.S. PATENT DOCUMENTS

| | | | | |
|---|---|---|---|---|
| 5,188,710 | A * | 2/1993 | Weber ...................... | B01D 3/02 202/185.3 |
| 5,536,375 | A * | 7/1996 | Vogelman ............... | B01D 1/305 202/160 |
| 2010/0123581 | A1 * | 5/2010 | Hatfield ............. | G06K 19/0716 340/572.3 |
| 2011/0169510 | A1 * | 7/2011 | Kandori ................ | B06B 1/0292 324/686 |
| 2014/0333291 | A1 * | 11/2014 | Willis ............... | H01L 31/02021 324/126 |
| 2016/0103086 | A1 * | 4/2016 | Kato ..................... | G01N 33/383 324/438 |
| 2016/0170546 | A1 * | 6/2016 | Lee ......................... | G06F 3/0418 345/173 |
| 2016/0187390 | A1 * | 6/2016 | Kshirsagar ......... | G01R 19/0084 324/126 |
| 2016/0239147 | A1 * | 8/2016 | Wang .................. | G06F 3/04182 |
| 2016/0380606 | A1 * | 12/2016 | Limjoco ............. | H01L 23/3107 361/767 |

* cited by examiner

*Primary Examiner* — Jeff W Natalini
(74) *Attorney, Agent, or Firm* — McClure, Qualey & Rodack, LLP

(57) ABSTRACT

A sensing device is provided in the present invention. The sensing device includes a first conductive element, a second conductive element, a processing unit, a cover and a base. The processing electrically connects to the first conductive element and the second conductive element. The cover has an opening. The base forms a space with the cover, and the first conductive element and the second conductive element are set on the base.

14 Claims, 7 Drawing Sheets

SENSING DEVICE, ELECTRONIC SYSTEM AND SENSING METHOD

This application claims the benefit of Taiwan application Serial No. 105130828, filed Sep. 23, 2016, the subject matter of which is incorporated herein by reference.

BACKGROUND OF THE INVENTION

Field of the Invention

The invention relates to a sensing technology, and more particularly to a sensing device, an electronic system and a sensing method.

Description of the Related Art

With the rapid development of sensing technology, the sensing device is widely used in human's daily life and plays a more and more important role. For instance, the sensing device is widely used in various electronic systems as an environment-sensing interface. In general, to optimize the electronic system so that the electronic system can be effectively operated in various environments, the electronic system itself has various operating modes to deal with the environments. However, at present, most of the electronic systems still rely on manpower to switch different operating modes. For instance, since a general electronic system is usually not provided with environment-sensing ability, user needs to manually adjust the electronic system to a corresponding operating mode when the user operates the electronic system under a particular environment. Although a sensing device, which is able to assist the electronic system to switch operating modes by sensing variation of pressure, is commercially available on the market, such a sensing device that senses physical variation of environment might cause significant errors due to other factors such as temperature, humidity and/or latitude, thereby leading to misjudgment of the electronic system.

Therefore, it is desired to provide a novel sensing technology able to improve sensitivity and accuracy of the sensing device, thereby improving stability of the electronic system.

SUMMARY OF THE INVENTION

One aspect of the present invention relates to a sensing device. The sensing device includes a first conductive element, a second conductive element, a processing unit, a cover and a base. The processing unit electrically connects to the first conductive element and the second conductive element. The cover has an opening. The base forms a space with the cover, and the first conductive element and the second conductive element are set on the base.

Another aspect of the present invention relates to a sensing device. The sensing device includes a processing unit, a first conductive element, a second conductive element and a base. The first conductive element includes a first pin portion, and the second conductive element includes a second pin portion. The first conductive element and the second conductive element respectively penetrate through the base by the first pin portion and the second pin portion to electrically connect to the processing unit.

Still another aspect of the present invention relates to a sensing device. The sensing device includes a base, a first conductive element, a second conductive element and a processing unit. The first conductive element is set on the base, and the second conductive element is set on the base. The processing unit outputs a signal in accordance with a potential difference between the first conductive element and the second conductive element.

Still another aspect of the present invention relates to an electronic system. The electronic system includes the sensing device in accordance with any one of the above aspects and a controller.

Still another aspect of the present invention relates to a sensing method applied to a sensing device. The sensing device includes a first conductive element, a second conductive element and a processing unit. The processing unit electrically connects to the first conductive element and the second conductive element. The sensing method includes the following steps. Provide an input voltage to the processing unit. While a potential difference is generated between the first conductive element and the second conductive element, the processing unit generates a bias voltage in accordance with the potential difference and the input voltage, and outputs a signal n accordance with the bias voltage.

DETAILED DESCRIPTION OF THE INVENTION

Figure 1A:
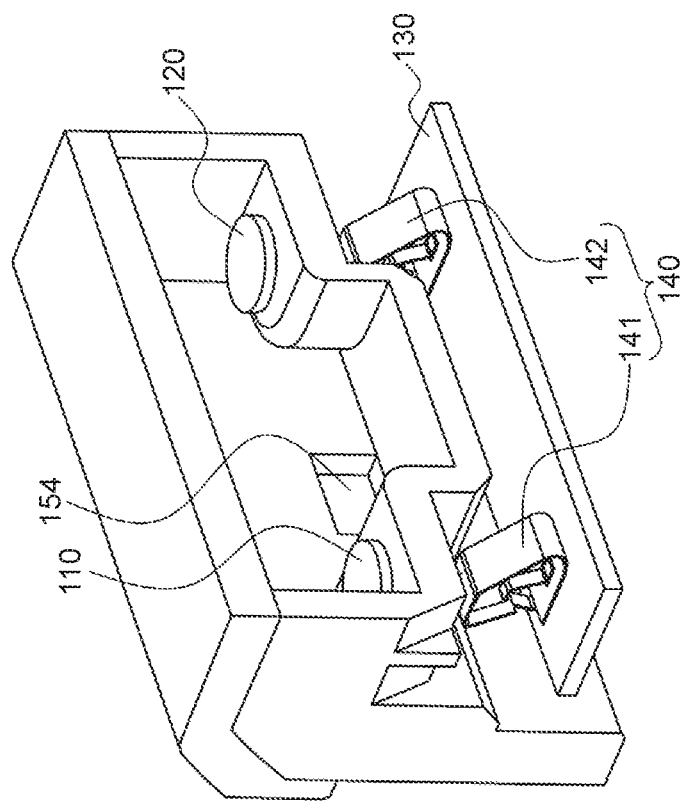
FIGS. 1A and 1B are schematic diagrams showing partial structure of a sensing device according to an embodiment of the present invention.

A number of embodiments are exemplified below with accompanying drawings to elaborate the invention in detail for a better understanding of the present invention. However, the provided embodiments are not intended to limit the scope encompassed by the present invention, and the description of how to operate the structure is not intended to limit the sequence under which the structure is executed. Any structures that are reassembled by the elements, resulting in devices with equivalent effect, are encompassed by the present invention. Besides, according to the standards and common practices of industry, the drawings are used for illustrative purpose, and the scales used in the drawings are not based on the scales of actual products. In practice, the size of each feature may be optionally increased or decreased for illustration. In the following description, identical reference numerals are used to indicate identical elements for understanding.

In the present invention, when an element is referred to "connect" or "couple", it may mean that the element "electrically connects" or "electrically couples". In addition, it may be used to indicate that two or more elements operate mutually or interact with each other. Furthermore, although the terms "first", "second", etc., are used in the present invention for indicating different elements, such terms are merely used to distinguish elements or operations that are described in the same technical language.

Figure 1B:
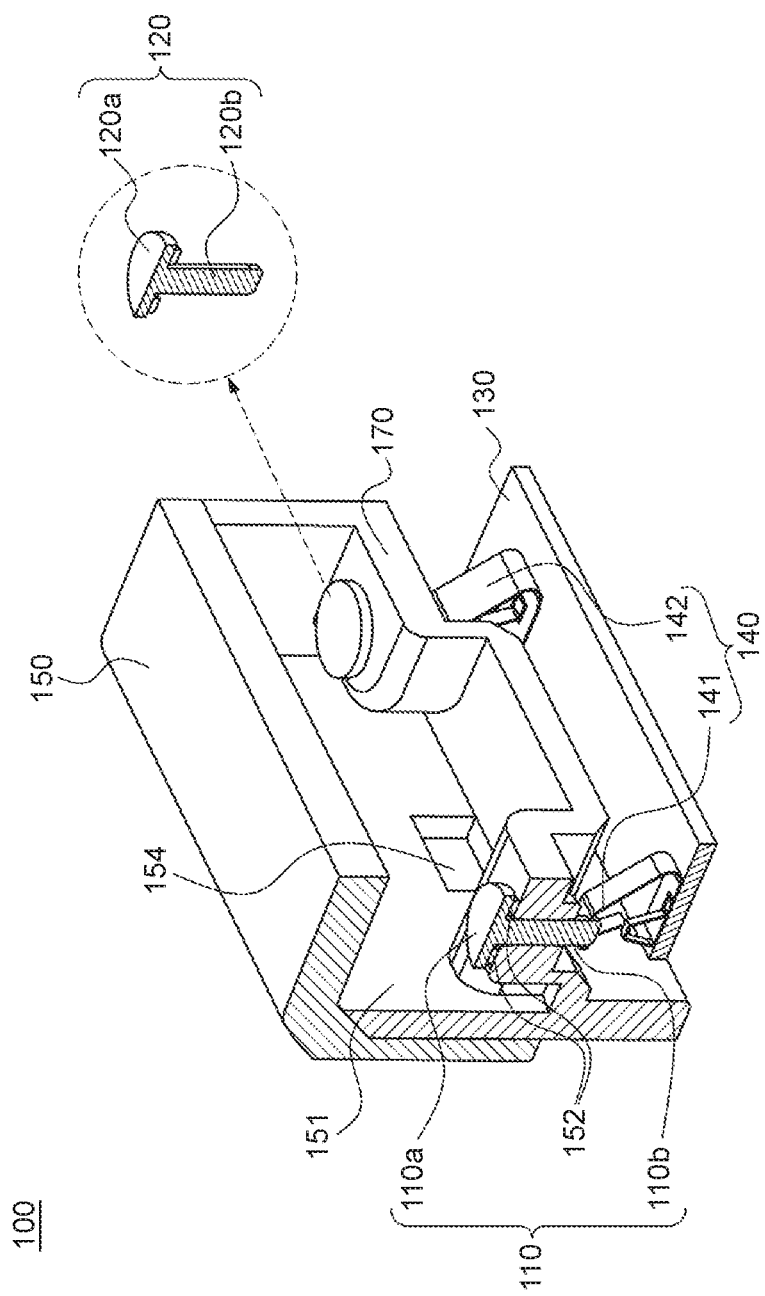

FIGS. 1A and 1B are schematic diagrams showing partial structure of a sensing device 100 according to an embodiment of the present invention. As shown in FIGS. 1A and 1B, the sensing device 100 includes a first conductive element 110, a second conductive element 120 and a processing unit 130. The processing unit 130 electrically connects to the first conductive element 110 and the second conductive element 120. In other words, the first conductive element 110 and the second conductive element 120 may electrically connect with each other by the processing unit 130. As a result, if a potential difference is present between the first conductive element 110 and the second conductive element 120, it may be detected by the processing unit 130.

Furthermore, the sensing device 100 may further include a connection member 140. The connection member 140 may be disposed between the processing unit 130 and the first conductive element 110, and between the processing unit 130 and the second conductive element 120. Specifically, the connection member 140 may include a first connection piece 141 disposed between the processing unit 130 and the first conductive element 110 and a second connection piece 142 disposed between the processing unit 130 and the second conductive element 120.

Moreover, the processing unit 130 may electrically connect to the first conductive element 110 and the second conductive element 120 respectively through the connection member 140. The first conductive element 110 may include a first connection portion 110a and a first pin portion 110b. The second conductive element 120 may include a second connection portion 120a and a second pin portion 120b. Specifically, the first conductive element 110 may penetrate through a base 170 by the first pin portion 110b to electrically connect to the processing unit 130. The second conductive element 120 may penetrate through the base 170 by the second pin portion 120b to electrically connect to the processing unit 130. In one embodiment, while an electrically conductible medium is present between the first connection portion 110a of the first conductive element 110 and the second connection portion 120a of the second conductive element 120 so that the first conductive element 110 electrically connects to the second conductive element 120, an impedance is present between the first conductive element 110 and the second conductive element 120 due to the medium, resulting in a potential difference therebetween. The electrically conductible medium includes but is not limited to liquid, solid or gas, or a mixture or a compound including at least two of liquid, solid and gas.

Referring to FIG. 1B, the sensing device 100 may further include a cover 150 and a base 170. A space 151 is formed between the cover 150 and the base 170. The first conductive element 110 and the second conductive element 120 may be set on the base 170. The first connection portion 110a and the second connection portion 120a are exposed to the space 151 from the base 170. While the electrically conductible medium is connected between the first connection portion 110a and the second connection portion 120a so that the first connection portion 110a and the second connection portion 120a are electrically connected, a potential difference is present between the first connection portion 110a and the second connection portion 120a.

In one embodiment, the cover 154 includes an opening 154. When a medium enters the space 151 through the opening 150 and is in contact with the first connection portion 110a and the second connection portion 120a at the same time, the first connection portion 110a and the second connection portion 120a are electrically connected, resulting in a potential difference generated therebetween. Furthermore, the medium may be discharged out of the space 151 via the opening 154, so that an open circuit occurs between the first connection portion 110a and the second connection portion 120a.

In another embodiment, the sensing device 100 may further include pads 152 respectively disposed around the first pin portion 110b and the second pin portion 120b. The first conductive element 110 and the second conductive element 120 may be more compactly disposed on the base 170 through the respective pads 152. Furthermore, the pads 152 may be pads with elasticity or flexibility. The first conductive element 110 and the second conductive element 120 may be in the form of a nut, but the present invention is not limited thereto.

Figure 2A:
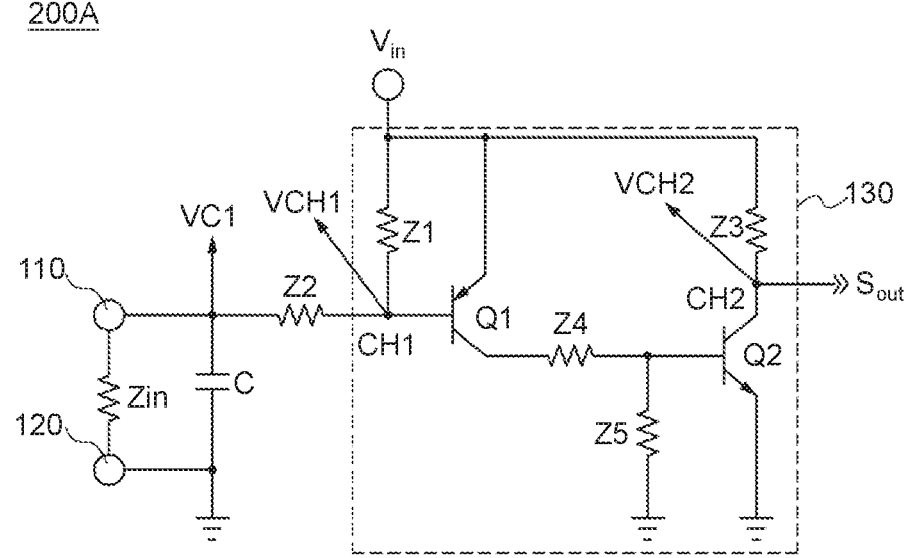
FIGS. 2A, 2B and 2C are circuit diagrams of sensing devices according to embodiments of the present invention.

FIG. 2A is a circuit diagram of a sensing device 200A according to an embodiment of the present invention. The sensing device 200A may include a plurality of impedance elements and two switches. If a plurality of switches are used, the switches with identical or different specifications may be employed, including but not limited to transistors. Each of the impedance elements may conform with identical or different specifications, including but not limited to resistances.

Specifically, as shown in FIG. 2A, the input terminal of the input voltage Vin electrically connects to the first end of the impedance element Z1, the emitter of the first transistor Q1 and the first end of the impedance element Z3. The first conductive element 110 electrically connects to the first end of the impedance element Z2. The second end of the impedance element Z2, the second end of the impedance element Z1 and the base of the first transistor Q1 electrically connect to the first node CH1. The second end of the impedance element Z3 and the collector of the second transistor Q2 electrically connect to the second node CH2. The first end of the impedance element Z4 electrically connects to the collector of the first transistor Q1, and the second end of the impedance element Z4 electrically connects to the first end of the impedance element Z5 and the base of the second transistor Q2. The second end of the impedance element Z5, the emitter of the second transistor Q2 and the second conductive element 120 electrically connect to the ground terminal. While an electrically conductible medium is present between the first conductive element 110 and the second conductive element 120 so that the first conductive element 110 electrically connects to the second conductive element 120, an impedance Zin is present between the first conductive element 110 and the second conductive element 120 due to the medium. In another embodiment, an inductor C may further be electrically connected between the first end of the impedance element Z2 and the ground terminal.

Referring to FIGS. 1A and 2A at the same time, in a condition that there is no electrically conductible medium between the first connection portion 110a and the second connection portion 120a, or that there is only a normal gas medium present between the first connection portion 110a and the second connection portion 120a, a status between the first connection portion 110a and the second connection portion 120a is equivalent to an open circuit. If an electrically conductible medium is present between the first connection portion 110a and the second connection portion 120a so that the first connection portion 110a electrically connects to the second connection portion 120a, an impedance Zin is present between the first connection portion 110a and the second connection portion 120a due to the medium, thereby resulting in a potential difference VC1. The electrically conductible medium includes but is not limited to liquid, solid or gas, or a mixture or a compound including at least two of liquid, solid and gas.

In one embodiment, if a medium is in contact with the first connection portion 110a of the first conductive element 110 and the second connection portion 120a of the second conductive element 120 so that a potential difference VC1 is generated between the first conductive element 110 and the second conductive element 120, the first node CH1 may generate a bias voltage VCH1, and the second node CH2 may generate a signal Sout (i.e., the voltage value VCH2 of the second node CH2).

In one embodiment, while the bias voltage VCH1 is equal to or less than a threshold value, the processing unit 130 outputs the signal Sout in a first level. While the bias voltage VCH1 is greater than the threshold value, the processing unit 130 outputs the signal Sout in a second level.

Referring to FIG. 2A, further, while a potential difference VC1 is present between the first conductive element 110 and the second conductive element 120, and the bias voltage VCH1 is equal to or less than the threshold value, the first transistor Q1 and the second transistor Q2 are turned on, so that the processing unit 130 outputs the signal Sout in a low level. While the bias voltage VCH1 is greater than the threshold value, the first transistor Q1 and the second transistor Q2 are not turned on, so that the processing unit 130 outputs the signal Sout in a high level. The input voltage Vin may be 3.3V, and the threshold value may be 2.74V, but the present invention is not limited thereto.

Table 1 is a look-up table listing relationship between the bias voltage VCH1 of the first node CH1 and the signal Sout of the second node CH2 in the sensing device 200A. From Table 1, in a condition that the input voltage Vin is 3.3V, the sensing device 200A may output the signal Sout in a lower level while the bias voltage VCH1 is equal to or less than 2.74V; the sensing device 200A may output the signal Sout in a higher level while the bias voltage VCH1 is greater than 2.74V.

TABLE 1

| Bias voltage VCH1 | Signal Sout |
| --- | --- |
| 1.0 V | 33 mV |
| 2.0 V | 33 mV |
| 2.5 V | 33 mV |
| 2.7 V | 33 mV |
| 2.71 V | 33 mV |
| 2.72 V | 33 mV |
| 2.73 V | 43 mV |
| 2.74 V | 72 mV |
| 2.75 V | 1.62 V |
| 2.76 V | 3.3 V |
| 3.0 V | 3.3 V |
| 3.3 V | 3.3 V |

Figure 2B:
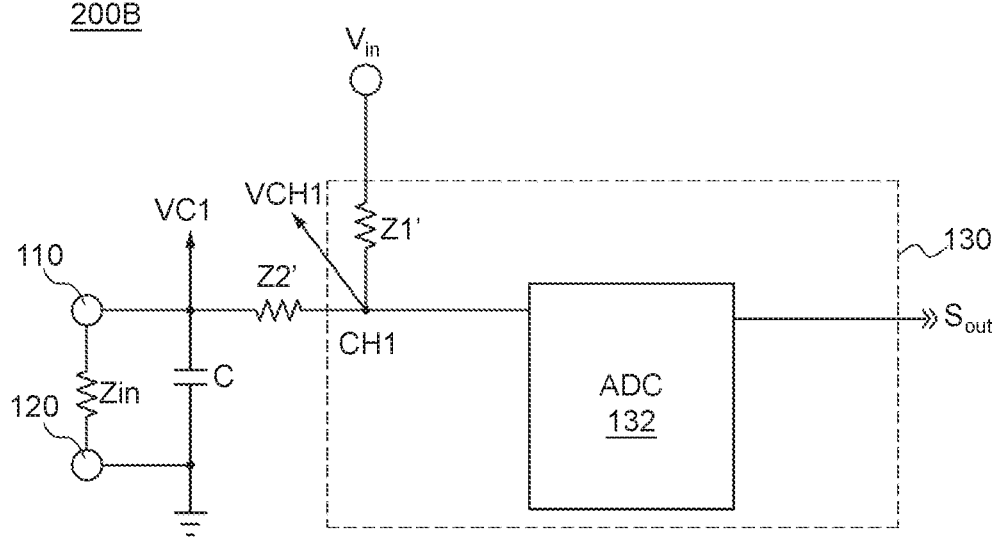

FIG. 2B is a circuit diagram of a sensing device 200B according to another embodiment of the present invention. As shown in FIG. 2B, the sensing device 200B may include an A/D converter (Analog to Digital Converter) 132 and impedance elements. The A/D converter 132 may output a digitized signal Sout in accordance with the bias voltage VCH1 of the first node CH1.

Specifically, the first end of the impedance element Z1' electrically connects to the input voltage Vin. The first conductive element 110 electrically connects to the first end of the impedance element Z2', and the second conductive element 120 electrically connects to the ground terminal. The second end of the impedance element Z1', the second end of the impedance element Z2' and the A/D converter 132 electrically connect to the first node CH1. Furthermore, an inductor C may further be electrically connected between the first end of the impedance element Z2' and the ground terminal.

In one embodiment, the sensing device 200B employs an A/D converter 132 having n-bit resolution. Therefore, the A/D converter 132 may convert the analog bias voltage VCH1 into the digitized signal Sout having $2^n$ different discrete values. When a status between the first connection portion 110a and the second connection portion 120a is short-circuited, and the analog signal of the bias voltage VCH1 is 0V, the A/D converter 132 outputs the digitized signal Sout having discrete value equal to 0. When a status between the first conductive element 110 and the second conductive element 120 is open-circuited, the A/D converter 132 outputs the digitized signal Sout having discrete value equal to $2^n$. When a status between the first conductive element 110 and the second conductive element 120 is open-circuited, the analog signal of the bias voltage VCH1 is 3.3V, and/or the A/D converter 132 may be an A/D converter having 2-bit or 14-bit resolution, but the present invention is not limited thereto.

Figure 2C:
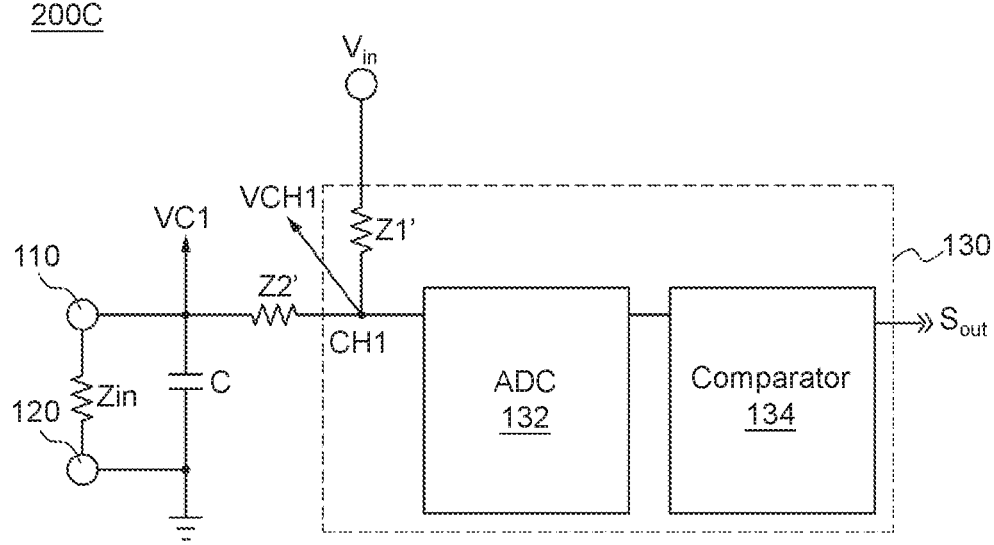

FIG. 2C is a circuit diagram of a sensing device 200C according to still another embodiment of the present invention. The sensing device 200C shown in FIG. 2C is substantially the same as the sensing device 200B shown in FIG. 2B, and identical reference numerals are used herein to indicate identical elements. The difference between FIG. 2C and FIG. 2B is that the sensing device 200C may further include a comparator 134, and the comparator 134 may electrically connect to the output terminal of the A/D converter 132. The comparator 134 may compare the digitized signal Sout output from the A/D converter 132 with a threshold value group. The threshold value group may include one or more than one threshold value.

In one embodiment, the threshold value group includes a plurality of threshold values. While the digitized signal Sout is equal to or less than a first threshold value, the processing unit 130 may determine that the medium is a first medium. While the digitized signal Sout is greater than the first threshold value and is equal to or less than a second threshold value, the processing unit 130 may determine that the medium is a second medium. While the digitized signal Sout is greater than the second threshold value, the processing unit 130 may determine that the medium is a third medium. In other words, the processing unit 130 may determine the category and property of the medium in accordance with the bias voltage VCH1 and the output signal of A/D converter 132. The above embodiments are not intended to limit the present invention. The sensing device 200B is not limited for determining whether the medium is any one of the first medium, the second medium and the third medium, and the category and number to be determined of the medium may be flexibly adjusted according to actual operating condition.

In still another embodiment, the processing unit 130 may perform the above determining operation by the comparator 134. In other words, while the digitized signal Sout is equal to or less than the first threshold value, the processing unit 130 may determine by the comparator 134 that the medium is the first medium. While the digitized signal Sout is greater than the first threshold value and is equal to or less than the second threshold value, the processing unit 130 may determine by the comparator 134 that the medium is the second medium. While the digitized signal Sout is greater than the second threshold value, the processing unit 130 may determine by the comparator 134 that the medium is the third medium.

Referring to FIG. 2B, Table 2 lists the digitized signals Sout output from the A/D converter 132 having 14-bit resolution for the same liquid medium respectively at temperature of 25° C. and 0° C.

TABLE 2

| Type of medium | 25° C. | 0° C. |
| --- | --- | --- |
| Open circuit | 16383 | 16383 |
| Short circuit | 0 | 0 |
| First medium | 987-1104 | 1056-1210 |
| Second medium | 1199-1308 | 1412-1528 |
| Third medium | 1311-1407 | 1343-1412 |
| Fourth medium | 1647-1759 | 2108-2249 |
| Fifth medium | 1730-1808 | 1827-1923 |
| Sixth medium | 3618-3824 | 3974-4183 |
| Seventh medium | 4987-5240 | 5142-5238 |

Figure 3A:
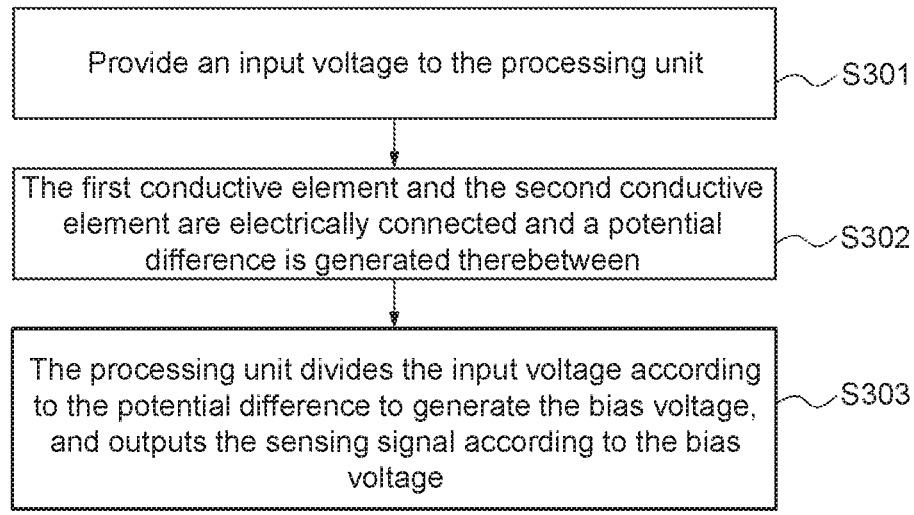
FIGS. 3A, 3B, 3C and 3D are flow charts of sensing methods according to embodiments of the present invention.

FIG. 3A is a flow chart of a sensing method 300A according to an embodiment of the present invention. Referring to FIGS. 1A, 2A, 2B, 2C and 3A, the sensing method 300A may be employed in the sensing devices 100, 200A, 200B and 200C. The sensing method 300A included the following steps:

Step S301: Provide an input voltage Vin to the processing unit 130.

Step S302: When the first conductive element 110 and the second conductive element 120 are electrically connected, an impedance Zin and/or a potential difference VC1 may be generated between the first connection portion 110a and the second connection portion 120a. The first conductive element 110 and the second conductive element 120 may be electrically connected via the medium.

Step S303: The processing unit 130 divides the input voltage Vin in accordance with the potential difference VC1 to generate the bias voltage VCH1, and outputs the signal Sout in accordance with the bias voltage VCH1.

Figure 3B:
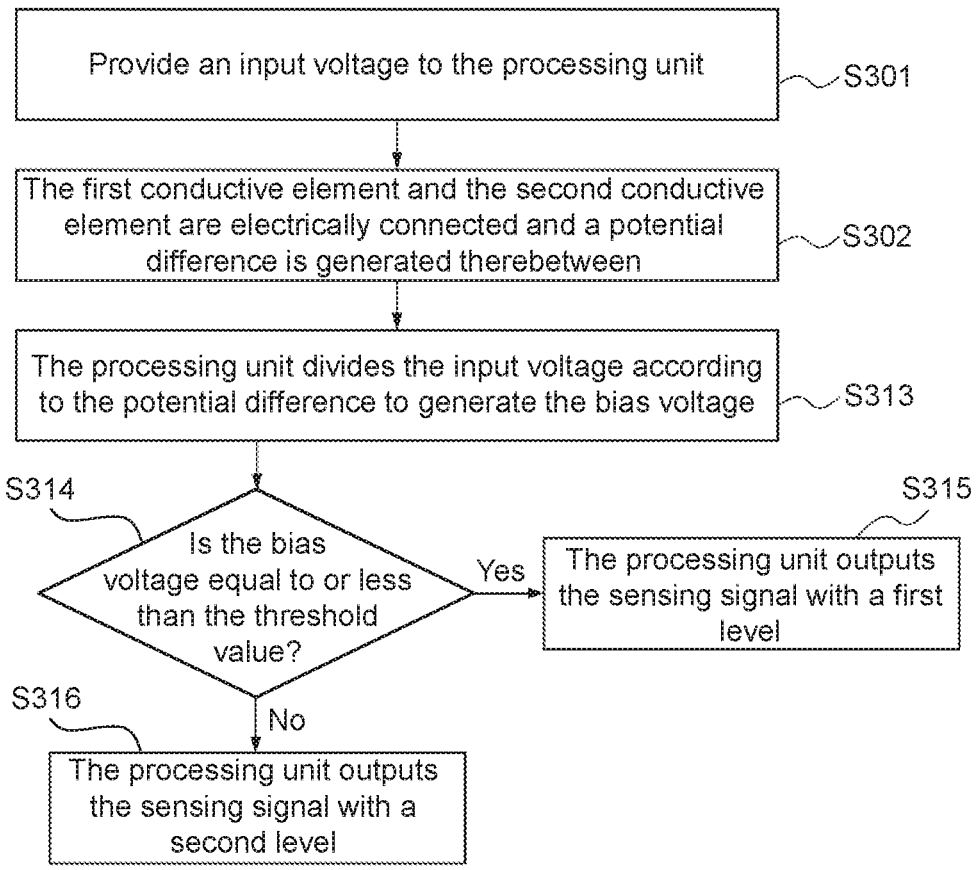

FIG. 3B is a flow chart of a sensing method 300B according to another embodiment of the present invention. The sensing method 300B shown in FIG. 3B is substantially the same as the sensing method 300A shown in FIG. 3A, and identical reference numerals are used herein to indicate identical elements. The difference between FIG. 3B and FIG. 3A is that after the step S301 and the step S302, the bias voltage VCH1 is determined based on the threshold value by the processing unit 130.

Referring to FIGS. 1A, 2A and 3B at the same time, after the step S302, the sensing method 300B further includes the following steps:

Step S313: The processing unit 130 divides the input voltage Vin according to the potential difference VC1 to generate the bias voltage VCH1.

Step S314: The processing unit 130 determines whether the bias voltage VCH1 is equal to or less than the threshold value.

Step S315: Following the previous step S314, if the result is yes, that is, if the bias voltage VCH1 is equal to or less than the threshold value, the processing unit 130 outputs the signal Sout in a first level.

Step S316: Following the previous step S314, if the result is no, that is, if the bias voltage VCH1 is greater than the threshold value, the processing unit 130 outputs the signal Sout in a second level.

Therefore, in the sensing method 300B, the signal Sout in a corresponding level may be output by comparing the bias voltage VCH1 with the predetermined threshold value.

In one embodiment, if an impedance Zin is generated between the first connection portion 110a and the second connection portion 120a via the medium, and the bias voltage VCH1 is equal to or less than the threshold value, the processing unit 130 outputs the signal Sout in a low level. If an open circuit occurs between the first connection portion 110a and the second connection portion 120a, and/or the bias voltage VCH1 is greater than the threshold value, the processing unit 130 outputs the signal Sout in a high level.

Figure 3C:
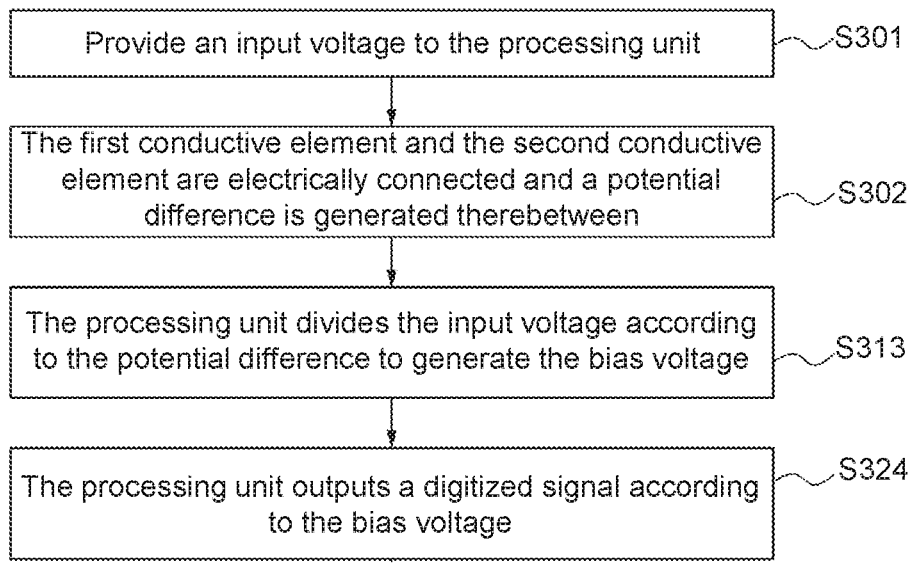

FIG. 3C is a flow chart of a sensing method 300C according to still another embodiment of the present invention. The sensing method 300C shown in FIG. 3C is substantially the same as the sensing method 300B shown in FIG. 3B, and identical reference numerals are used herein to indicate identical elements. The difference between FIG. 3C and FIG. 3B is that after the step S313, a digitized signal is output by the processing unit 130 according to the bias voltage VCH1, and therefore a digitized signal Sout may be output.

Referring to FIGS. 1A, 2B and 3C at the same time, after the step S313, the sensing method 300C may include the following steps:

Step S324: A digitized signal is output by the processing unit 130 according to the bias voltage VCH1.

In one embodiment, if an impedance Zin is generated between the first connection portion 110a and the second connection portion 120a via the medium, and the digitized signal is equal to or less than the threshold value, the processing unit 130 may output the "0" digitized signal Sout based on base-n number system. If an open circuit occurs between the first connection portion 110a and the second connection portion 120a, and the digitized signal is greater than the threshold value, the processing unit 130 outputs the "1" digitized signal Sout based on base-n number system. The base-n number system may be binary numeral system. In other words, the sensing method 300C may convert the bias voltage VCH1 into the digitized signal, and compare the digitized signal with the threshold value, thereby outputting a corresponding digitized signal Sout.

Figure 3D:
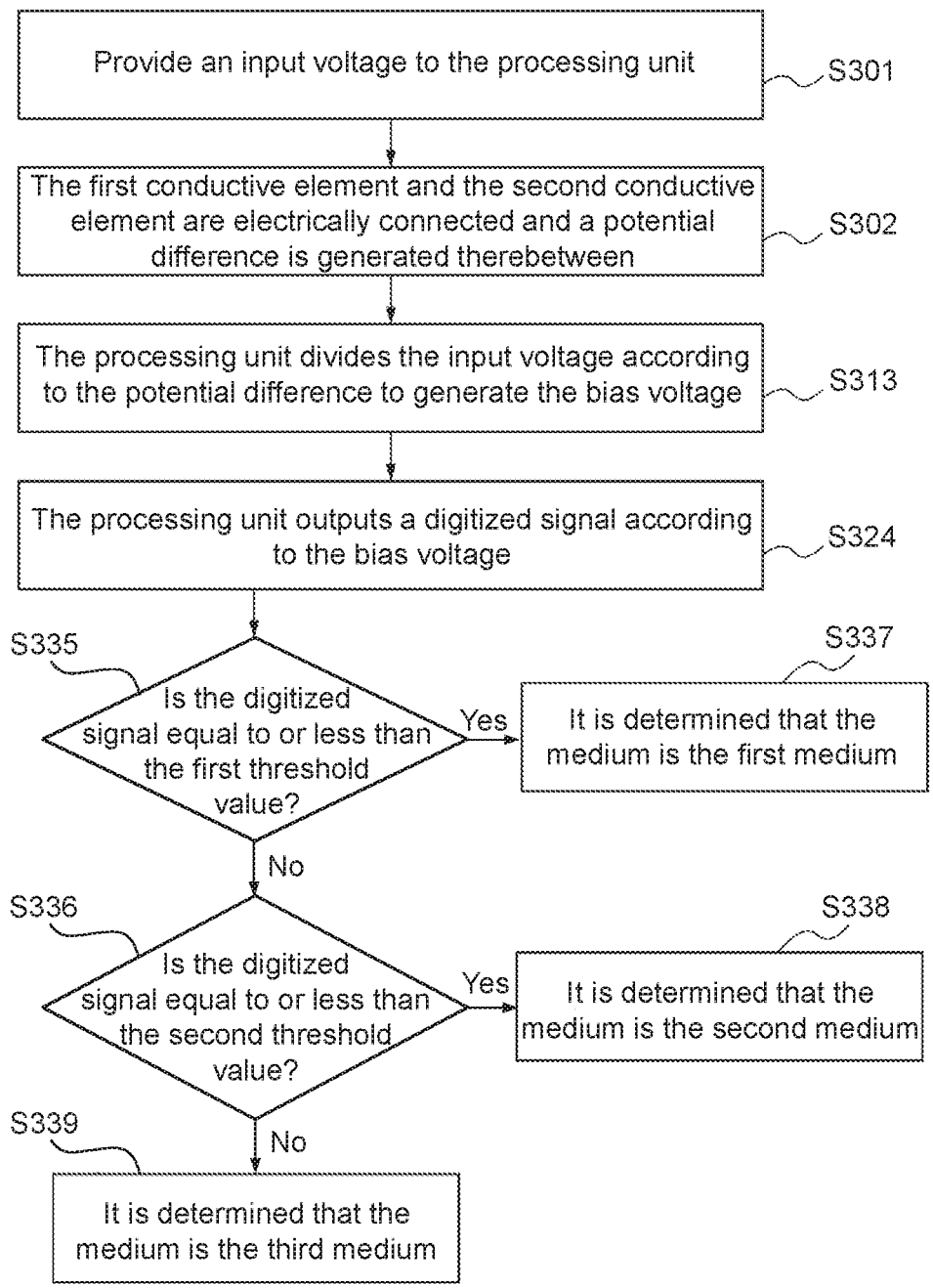

FIG. 3D is a flow chart of a sensing method 300D according to a further embodiment of the present invention. The sensing method 300D shown in FIG. 3D is substantially the same as the sensing method 300C shown in FIG. 3C, and identical reference numerals are used herein to indicate identical elements. The difference between FIG. 3D and FIG. 3C is that after the step S324, the medium may be further defined by a plurality of threshold values of the threshold value group.

Referring to FIGS. 1A, 2C and 3C at the same time, after the step S324, the sensing method 300D may include the fallowing steps:

Step S335: Determine whether the digitized signal is equal to or less than the first threshold value.

Step S336: Following the previous step S335, if the result is no, that is, if the digitized signal is greater than the first threshold value, further determine whether the digitized signal is greater than the first threshold value, and is equal to or less than the second threshold value.

Step S337: Following the previous step S335, if the result is yes, that is, if the digitized signal is equal to or less than the first threshold value, it is determined that the medium is the first medium.

Step S338: Following the previous step S336, if the result is yes, that is, if the digitized signal is greater than the first threshold value, and is equal to or less than the second threshold value, it is determined that the medium is the second medium.

Step S339: Following the previous step S336, if the result is no, that is, if the digitized signal is greater than the second threshold value, it is determined that the medium is the third medium.

In one embodiment, the sensing method 300D may convert the bias voltage VCH1 into the digitized signal, and compare the digitized signal with the threshold value group, thereby determining the medium. The threshold value group at least includes a first threshold value and a second threshold value, and the first threshold value and the second value may respectively be a predetermined value, an adjustable value under the current environment detected by the system and/or set by the user, but the present invention is not limited thereto.

Figure 4:
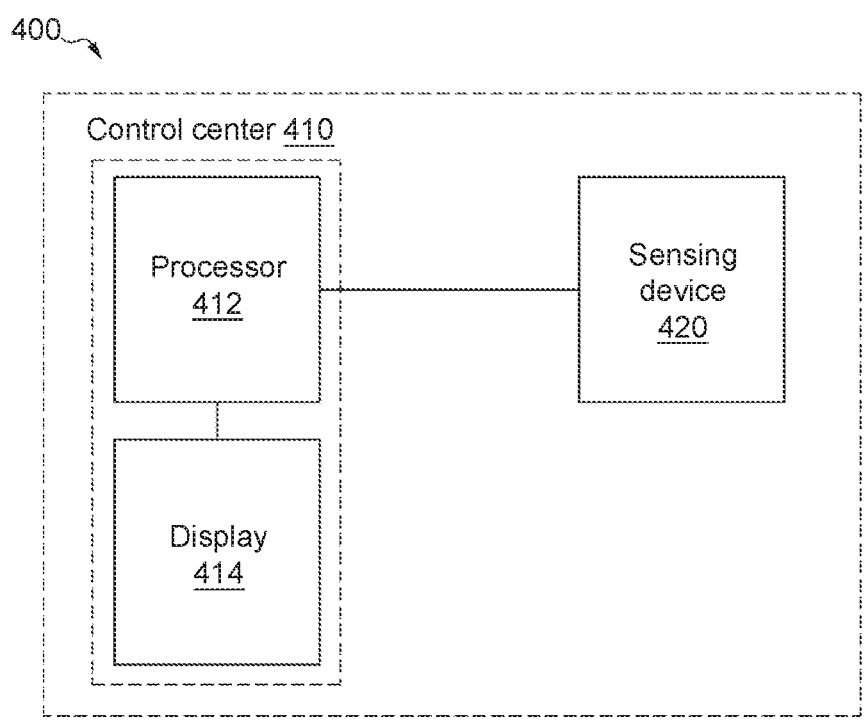
FIG. 4 is a block diagram of an electronic system according to an embodiment of the present invention.

FIG. 4 is a block diagram of an electronic system 400 according to an embodiment of the present invention. The electronic system 400 includes but is not limited to a handheld electronic system, a portable communication system, a vehicle electronic system, a camera/video system, an aerial photography system and an underwater electronic system.

As shown in FIG. 4, the electronic system 400 includes a controller 410 and a sensing device 420. The controller 410 may include a processor 412 and a display 414. The sensing device 420 may be any one of the sensing devices 100, 200A, 200B and 200C, and/or any one of the sensing methods 300A, 300B, 300C and 300D may be employed in the sensing device 420. The processor 412 electrically connects to the display 414 and the sensing device 420, and the display 414 includes but is not limited to a panel, a light emitter and a loud speaker. Furthermore, the electronic system 400 may further include a power module (not shown) providing an input voltage Vin.

Referring to FIG. 4, after obtaining the signal Sout through the first conductive element 110, the second conductive element 120 and the processing unit 130, the sensing device 420 may transmit the signal Sout to the controller 410. The processor 412 may determine whether a impedance Zin and/or a potential difference VC1 are/is present between the first conductive element 110 and the second conductive element 120 according to the signal Sout, so that the display 414 may send out a corresponding message, and/or the processor 412 may perform a predetermined procedure. The predetermined procedure includes but is not limited to changing the modes of the system, switching to protection mode and/or cutting power supply of the power module of the electronic system 400 off.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing device for identifying a medium, the sensing device comprising:
    a cover having an opening;
    a base forming a space with the cover;
    a first conductive element having a first connection portion and a first pin portion penetrating through the base, and the first conductive element set on the base by the first pin portion;
    a second conductive element comprising a second connection portion and a second pin portion penetrating through the base, the second connection portion set on the base by the second pin portion, and the first connection portion and the second connection portion having a potential difference while the medium electrically connects the first connection portion and the second connection portion; and
    a processing unit comparing the potential difference with a first threshold value and a second threshold value and determining the medium is a first medium while the potential difference is equal to or less than the first threshold value, the medium is a second medium while the potential difference is greater than the first threshold value and is equal to or less than the second threshold value, or the medium is a third medium while the potential difference is greater than the second threshold value.

2. The sensing device according to claim 1, wherein the first connection portion and the second connection portion are exposed from the base.

3. The sensing device according to claim 1, wherein the processing unit comprises at least one switch, or an A/D converter and/or a comparator.

4. The sensing device according to claim 3, wherein the processing unit outputs a signal in one of a plurality of levels through the switch, or a digitized signal through the A/D converter and/or the comparator.

5. An electronic system comprising the sensing device according to claim 1 and a controller, the controller performs a predetermined procedure and/or send out a corresponding message in accordance with an output of the sensing device.

6. A sensing device for identifying a medium, the sensing device comprising:
    a base;
    a first conductive element having a first connection portion and a first pin portion penetrating through the base, and the first connection portion set on the base by the first pin portion;
    a second conductive element comprising a second connection portion and a second pin portion penetrating through the base, the second connection portion set on the base by the second pin portion, and the first connection portion and the second connection portion having a potential difference while the medium electrically connects the first connection portion and the second connection portion; and
    a processing unit comparing the potential difference with a first threshold value and a second threshold value and determining the medium is a first medium while the potential difference is equal to or less than the first threshold value, is a second medium while the potential difference is greater than the first threshold value and is equal to or less than the second threshold value, or is a third medium while the potential difference is greater than the second threshold value.

7. The sensing device according to claim 6, wherein the first connection portion and the second connection portion are exposed from the base.

8. The sensing device according to claim 6, wherein the processing unit comprises at least one switch, or an A/D converter and/or a comparator.

9. The sensing device according to claim 8, wherein the processing unit outputs a signal in one of a plurality of levels through the switch, or a digitized signal through the A/D converter and/or the comparator.

10. An electronic system comprising the sensing device according to claim 6 and a controller, wherein the controller comprises a processor and/or a display, the processor performs a predetermined procedure in accordance an output of the sensing device, and the display sends out a corresponding message in accordance with the output of the sensing device.

11. An electronic system comprising:
a power module providing an input voltage; and
a sensing device having a base, a first conductive element, a second conductive element and a processing unit, the first conductive element having a first connection portion and a first pin portion penetrating through the base, the second conductive element having a second connection portion and a second pin portion penetrating through the base, the first connection portion and the second connection portion set on the base respectively by the first pin portion and the second pin portion, the first connection portion and the second connection portion having a potential difference while a medium electrically connects the first connection portion and the second connection portion; and
wherein the processing unit outputs a signal in accordance with a bias voltage generated according to the input voltage and the potential difference, compares the signal with a first threshold value and a second threshold value and determines the medium is a first medium while the signal is equal to or less than the first threshold value, is a second medium while the signal is greater than the first threshold value and is equal to or less than the second threshold value, or is a third medium while the signal is greater than the second threshold value.

12. The electronic system according to claim 11, wherein the processing unit comprises at least one switch, or an A/D converter and/or a comparator, and the processing unit outputs the signal in one of a plurality of levels through the switch, or the digitized signal through the A/D converter and/or the comparator.

13. The electronic system according to claim 11, further comprising a processor determining whether the potential difference is present between the first conductive element and the second conductive element in accordance with the signal.

14. The electronic system according to claim 13, further comprising a display providing a corresponding message in accordance with a determination result of the processor.

* * * * *